United States Patent Office 3,106,458
Patented Oct. 8, 1963

3,106,458
PROCESS FOR DETECTING NITROGEN DIOXIDE IN GASES
Karl Grosskopf, Lubeck, Germany, assignor to Otto Heinrich Drager, Lubeck, Germany
No Drawing. Filed Nov. 27, 1961, Ser. No. 155,166
Claims priority, application Germany Dec. 14, 1960
4 Claims. (Cl. 23—232)

The present invention relates to a process for determining the presence of nitrogen dioxide in gases by employing a benzidine reagent while preventing the interference of such gases as halogens and ozone upon the determination.

A process for detecting the presence of nitrogen dioxide by means of benzidine, tolidine, and other benzidine derivatives is known in which these reagents are precipitated or deposited upon a granular carrier. Silica gel is commonly employed as the granular carrier. Nitrogen dioxide reacts with these reagents to produce a change in color. It is also known to carry out this reaction in detector tubes, thus enabling a quantitative measurement of the nitrogen dioxide. The length of the colored zone and the amount of gas drawn through the detector tube make it possible to determine the nitrogen dioxide content in the gases tested.

Furthermore, it is known to use therein N,N,N',N'-tetra-phenylbenzidine or N,N'-dimethyl-N,N' - diphenylbenzidine, together with a strong acid, as reagents. Thus it is known to put these reagents in a detector tube along with a silica gel which is saturated with a strong acid. These processes have the disadvantage in the use of a strong acid which impairs the storage capacity or stability of the reagents and the detector tube.

Also, a process for detection of nitrogen dioxide in gases has been disclosed in my copending application, Serial No. 132,535, filed August 21, 1961, for "Method for Determining Nitrogen Dioxide in Gases," in which a benzidine derivative is sublimed onto a carrier and serves as the reagent. Preferably symmetrical N,N-diphenyl-benzidine serves as the reagent. The advantage is that the reagent is very finely distributed on the carrier. The carrier is first heated to a temperature of about 100° to 150° C., after which the benzidine derivative is added, and the granular carrier material then stirred or agitated until it cools to about room temperature. This is done preferably in a mixing drum. A silica gel having a bulk weight of about 500 grams per liter is used as the carrier.

Also, a process for the detection or determination of nitrogen monoxide is disclosed in the aforesaid application which employs this prepared carrier as a detector reagent. An oxidizing agent which consists of a ceramic granular carrier saturated with a sulphuric acid solution of chromic oxide is placed in the direction of flow of the gases to be tested.

A silica gel having a bulk weight of about 500 grams per liter can be used as a carrier in each of the foregoing processes.

The granular carrier treated with the reagent is placed in a sealed, transparent detector tube. This forms an indicating layer in the tube composed of about from 10 to 200 mg., preferably about 80 mg., of diphenylbenzidine sublimed upon 1 kg. of carrier material.

The foresaid processes are not accurate in the detection of particularly small amounts of nitrous gases in which the presence of especially halogens and ozone interfere with the detection reaction, that is, yield similar types of reactions. This, moreover, obviously interferes very much in the detection of very small amounts of nitrous gases, as in, for example, smog investigation. Reliable measurements cannot be established under these circumstances.

This invention, which strives to avoid the disadvantages of the known processes, is directed to a process for the detection of nitrogen dioxide in gases with the aid of benzidine derivatives wherein the gas to be tested is conducted first through a reaction layer containing aromatic amines, like benzidine derivatives, next through an oxidizing agent, and then through a second reagent indicating layer that also contains a benzidine derivative as a reagent. Surprisingly, it has been shown that in the second indicating layer, as seen in the direction of the flow, a color change results, the extent of which corresponds accurately to the amount of nitrous gases to be detected. Other ingredients or constituents in the gas to be tested, especially like halogens and ozone, do not interfere with the determination or are not indicated in the second indicating layer.

When the test gas contains NO, then it is initially passed through a first oxidizing layer to form $NO_2$. Then there is a formation of nitrogen monoxide in the first reaction layer by the reaction between nitrogen dioxide and the aromatic amines, for example, benzidines, such that a further reaction with the aromatic amines does not occur and this layer remains unchanged insofar as NO is concerned. Therewith, the amount of nitrogen monoxide released from this layer is half as large as the amount of nitrogen dioxide theoretically present. The formed nitrogen monoxide is oxidized in a second oxidzing layer yielding $NO_2$ again which is then detected with a benzidine derivative in a second indicating layer. As far as halogens or ozone are present in the gases tested, these are reacted in the first indicating reaction layer and do not interfere further. This invention has the advantage of being a specific determination.

Further particulars or features of the invention are given in the following performed example. This determinating process was done with the aid of a detector tube.

The detector tube was about 20 cm. long and contained four layers.

The first layer contained an oxidizing agent composed of 100 grams of a granular calcium aluminum silicate ceramic carrier having a particle size of 0.6–0.75 mm. imprgenated with 10 grams of chromic acid anhydride and 2 ml. of concentrated sulphuric acid.

The second layer consisted of silica gel having a bulk weight of about 500 grams per liter and a particle size of 0.6–0.75 mm. The silica gel was washed with hydrochloric acid, hydrogen peroxide was added as an oxidizing agent, and heated to glowing at a temperature of about 500° C. Then 1 kg. of the carrier material was heated to about 125° C., placed in a mixing drum at once and reacted with 500 mg. of diphenylbenzidine. The mixing drum was allowed to cool to room temperature, whereupon the reagent was sublimed upon the carrier. Finally, 2 ml. of glacial acetic acid was added to the preparation and subsequently intimately mixed. The glacial acetic acid addition can also be omitted.

The third layer was formed like the first, and the fourth layer like the second, with the difference that only 50 mg. of diphenylbenzidine was sublimed upon 1 kg. of carrier.

The carrier material in the second layer can contain about 200–800 mg. of diphenylbenzidine, and about 10 to 100 mg. of diphenylbenzidine in the fourth layer of 1 kg. of carrier material.

The described detector tube has a measuring range of from 0.005 p.p.m. to 0.5 p.p.m. with a 1 liter amount of air tested, but a parts per million range of 1 part in 106 parts has been obtained. The measuring range, however, is adjusted to smaller concentrations in the parts per billion range by drawing a correspondingly larger volume of air to be tested through the detector tubes.

Having now described the means by which the objects of the invention are obtained, I claim:

1. A process for the specific colorimetric determination of nitrogen dioxide in gases comprising contacting the gases respectively with a compound selected from the group consisting of tolidine, benzidine and benzidine derivatives, an oxidizing agent and a benzidine derivative, and observing the color of the latter benzidine derivative which changes color upon contact with nitrogen dioxide.

2. A process as in claim 1, said benzidine derivative being sublimed upon a granular carrier.

3. A process as in claim 1, said benzidine derivative being symmetrical N,N-diphenylbenzidine, and sublimed upon a granular carrier composed of silica gel having a particle size of about 0.6 to 0.75 mm. and a bulk weight of about 500 grams per liter.

4. A process for the specific colorimetric determination of nitrogen dioxide in gases comprising the following sequential steps:
   (1) contacting the gases with a compound selected from the group consisting of tolidine, benzidine and benzidine derivatives;
   (2) contacting the gases with an oxidizing agent composed of a granular carrier saturated with a sulphuric acid solution of chromic oxide;
   (3) contacting the gases with symmetrical N,N-diphenylbenzidine sublimed upon a granular carrier; and
   (4) observing the color of the N,N-diphenylbenzidine of step (3) which changes color upon contact with nitrogen dioxide.

References Cited in the file of this patent

UNITED STATES PATENTS 2,963,351      Stanford et al. _____ Dec. 6, 1960